United States Patent [19]

Larker et al.

[11] 3,773,506
[45] Nov. 20, 1973

[54] METHOD OF MANUFACTURING A BLADE HAVING A PLURALITY OF INTERNAL COOLING CHANNELS

[75] Inventors: Hans Larker; Sven-Erik Isaksson, both of Robertsfors, Sweden

[73] Assignee: Allmanna Svenska Elektriska Aktiebolaget, Vasteras, Sweden

[22] Filed: Mar. 23, 1972

[21] Appl. No.: 237,368

[30] Foreign Application Priority Data
Mar. 26, 1971 Sweden................................ 3960/71

[52] U.S. Cl............ 75/208 R, 29/156.8 B, 75/222, 75/226
[51] Int. Cl............................ B22f 7/00, B21k 3/04
[58] Field of Search...................... 75/214, 226, 208, 75/222; 29/156.8 B, 156.8 H, 156.8 T

[56] References Cited
UNITED STATES PATENTS 3,615,382 10/1971 Manilla et al........................ 75/214
3,008,223 11/1961 Frank............................. 29/156.8 H
2,751,293 6/1956 Haller................................... 75/214

Primary Examiner—Carl D. Quarforth
Assistant Examiner—R. E. Schafer
Attorney—Jennings Bailey, Jr.

[57] ABSTRACT

In manufacturing blades for gas turbines with a plurality of inner cooling channels by isostatic compression, a sintering capsule of deformable material is provided with thin-walled tubes arranged substantially parallel to the capsule wall parts corresponding to the high and low pressure surfaces of the blade. A powdered material is poured into the capsule, which is then evacuated, sealed and heated to at least 800°C. Thereafter the heated capsule is subjected to an external gas pressure of at least 500 bars. Simultaneously with the compression, the tubes are subjected to such a high internal gas pressure that the linear decrease in the tube cross-section is at most 50 percent.

8 Claims, 8 Drawing Figures

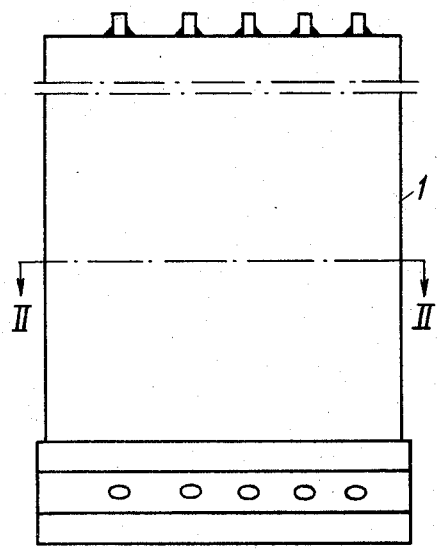
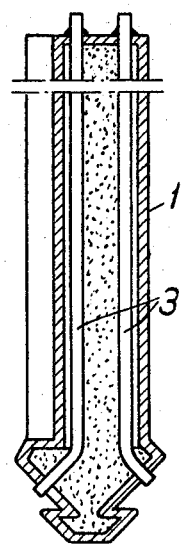
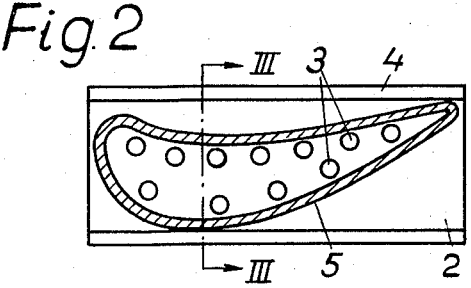
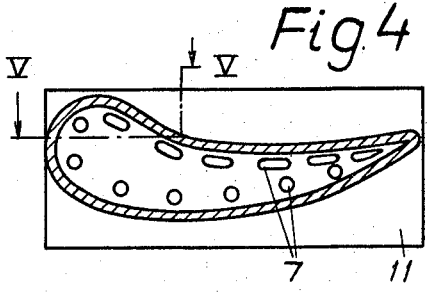
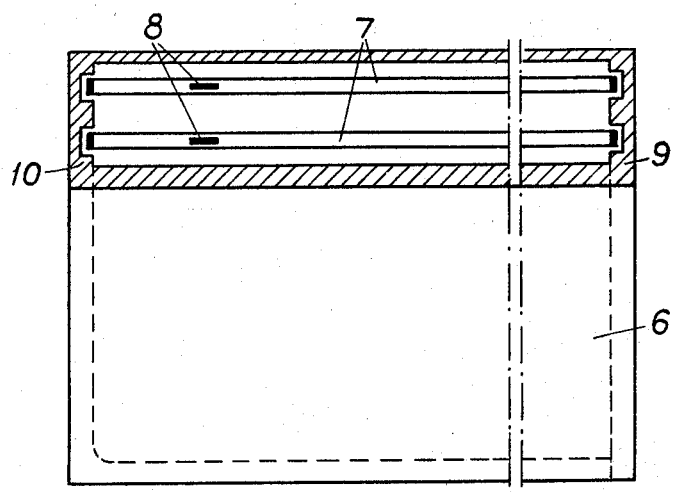

METHOD OF MANUFACTURING A BLADE HAVING A PLURALITY OF INTERNAL COOLING CHANNELS

BACKGROUND OF THE INVENTION

1. Field of the Invention

The present invention relates to a method of manufacturing a blade for a gas turbine, having a plurality of internal cooling channels, using a sintering capsule of a material which, at least at high temperatures, can be plastically deformed, the capsule having substantially the same shape, enlarged, as the blade.

The term "gas turbines" in the following also covers certain steam turbines operating at extreme temperatures and the term "blade" covers both guide vanes and running vanes.

It has so far not been found practicable to cast vanes of the above-mentioned type. Since the heat-resistant blade materials in question have very high melting points it has in practice been impossible to find a material which could be used for the mould to "provide" a fairly large number of thin cooling channels in a cast gas turbine blade.

If, for example, a plurality of metal tubes were to be placed in the casting mould in order to provide cooling channels, the tubes would melt or at least be deformed to such as extent that their final position and cross-sectional area could hardly be predicted in advance.

Through U.S. Pat. No. 3,846,758 it is known to form a gas turbine blade starting with a tubular billet having circular cross-section, plastic treatment of the billet giving the tube such cross-sectional shape that it can be used as a turbine blade, the cavity surrounded by the tube walls being used as cooling channel.

Through Swedish Pat. No. 167,979 it is known to weld together two blades having curved profiles in such a way that one surface of the first vane provided with ribs, together with an adjacent surface of the second vane, forms a blade having internal cooling channels directed longitudinally and having transverse outlet sections.

It is also known to manufacture gas turbine blades by means of isostatic compression, so-called hot-compacting, in which a material having high thermal resistance is poured into a sintering capsule in the shape of a blade, which is then heated to high temperature, for example above 1,100°C, evacuated and subjected to high external gas pressure. Hot-compacting is described in U.S. Pats. No. 3,628,779 and 3,695,597.

By means of hot-compacting it is possible to manufacture gas turbines in an extremely hard material, for example Astroloy, which retains its high strength and corrosion resistance at a considerably higher temperature of the blade than can be permitted for blades manufactured in any other way.

However, even with such blades sintered at high pressure and high temperature, it would be considerably better if by means of internal cooling, for example with compressed air, a temperature could be achieved for the blade which would be considerably lower than the temperature of the gas flowing through the turbine. It would then be possible to permit considerably higher gas temperatures (for example an increase of 200°C), which would greatly improve the efficiency of the turbine.

Because of the extreme hardness of the material, cooling channels cannot be made by drilling and, although theoretically possible alternatives would be a spark machining process or electrochemical treatment, these processes take so much time and are so expensive that they can hardly be considered for channels which would have to be approximately the same length as a turbine blade. Furthermore, the choice of positioning the channels would be extremely limited with such processes. For example, the channels would have to run exactly straight in the longitudinal direction of the blade, whereas cooling channels in blades constructed differently are often curved in such a way that the coolant is introduced at the point of attachment of the blade and leaves through transverse, curved parts of the channels. Even if the cooling channels run mainly in the longitudinal direction of the blades, a certain curve may be necessary in connection with their connection to a common supply channel arranged in the carrying ring if the inlet part of the channels is to cause the least possible reduction of strength in the attachment part of the blade.

By means of a method according to the invention it is possible at much lower cost and to a much greater extent than with previously known manufacturing methods for sintered gas turbine vanes provided with cooling channels to fulfil the demands usually made on a cooling system for a turbine blade. The method is especially intended for manufacturing gas turbine vanes of an alloy which is particularly suitable for the purpose, i.e., an alloy having high thermal resistance and corrosion resistance at high temperatures. Known alloys of this type are characterised by extreme hardness and turning or grinding processes to shape the blades can only be used to a very limited extent if the manufacturing costs are to be kept at a reasonable level.

These alloys belong to a group characterised by the following composition:

Cr 13 – 24 percent

Ni 45 – 65 percent

Mo 5 – 10 percent

Co 3 – 16 percent as well as titanium and aluminium is relatively small quantities for example 3 or 4 percent.

As an example of such a sintering material may be mentioned the alloy known under the trde mark "Astroloy."

The invention is characterised in that the capsule is provided with a plurality of thin-walled tubes arranged substantially parallel to capsule wall parts corresponding to the high and low pressure surfaces of the blade, after which a powdered material is poured into the capsule and the filled capsule is evacuated, the evacuated capsule space being gas-tightly separated from the spaces surrounded by said tubes, after which the capsule is sealed and the capsule is heated together with its contents to at least 800°C, after which the heated capsule is subjected to an external gas pressure of at least 500 bars while the tubes are simultaneously subjected to such a high internal gas pressure that the linear decrease in the tube cross-section is at the most 50 percent.

A method according to the invention is very suitable if a rather large number of channels is desired having small cross-section, which is advantageous from several points of view. In such a cooling system it is possible to avoid the temperature difference which generally occurs between the high pressure side and the low pressure side of the blade, and the resultant temperature stresses which are considered by turbine constructors to be likely to cause cracking. Temperature equalization can be achieved by providing the two sides of the blades with cooling channels lying adjacent to each other, the ratio between the total channel cross-section of the two surfaces being chosen in accordance with the difference in generation of heat.

It can easily be understood that the negative results so far experienced concerning the possibility of placing a channel system formed of thin, thin-walled tubes in a casting mould which is to be filled with molten metal have disencouraged those skilled in the art from using a pre-fabricated system of such tubes when the cooling channels must be shaped with great precision and the manufacturing process causes the sensitive tubes to be subjected to mechanical and thermal stresses from a surrounding appealing compound.

However, experiments performed during the development working on which the present invention is based have shown that the metal powder is bonded to a certain extent during the heating which preceeds the actual compacting and that this bonding results in such a strong support for the tube system arranged in the mould that its various parts retain their positions in relation to each other and to the moulding capsule in spite of the temperature differences which must necessarily occur between the various parts of the tube system during the heating used in the process.

When the completely heated capsule is subjected to the high pressure necessary to achieve the intended degree of compaction, i.e., at least 90 percent, normally about 95 percent, and in certain cases more than 97 percent of the specific weight of the sintered metal, the cooling tubes are also subjected to considerable external pressure.

It is not possible to make these tubes capable of standing this pressure by choosing a sufficiently thick wall thickness, since if bodies relatively rich in the material of the blade were to be embedded in the blade material it would reduce the strength of the blade. According to the invention very thin-walled tubes are used instead, which are prevented from being squeezed together since a high gas pressure is permitted to operate on the inner surface. According to the invention this is achieved by enclosing a substance which is gaseous at the temperature in question, introduced into the tube system before the capsule is heated. Easily vaporised metal, for example, may be used, its vapour pressure at maximum capsule temperature being equivalent to the desired internal pressure in the tube. The inlet and outlet openings of the tube system should be closed during the compacting process and the closed pipe ends are preferably arranged inside the confines of the blade-shaped capsule, thus avoiding the problem of achieving gas-tight apertures. The wall of the capsule is preferably designed with recesses to surround the tube ends so that the tube system intended for the cooling channels can always by given an accurate and well-defined position in relation to the walls of the capsule. This embodiment of the invention is particularly favourable in cases where the tube system and the capsule are of different materials which do not join easily, for example glass and metal. The process assumes a final grinding of certain blade parts in order to open closed inlet and outlet openings.

According to another embodiment of the invention the necessary internal pressure is achieved by passing one or more tube ends in the tube system out through the capsule in a gas-tight manner without closing them, so that the tubes embedded in the sintering powder acquire an internal pressure which is equal to the gas pressure used for the compacting. If the number of tube penetrations is less than the intended number of openings, a final grinding of the finished blade is required to open embedded tube ends.

BRIEF DESCRIPTION OF THE DRAWINGS

In the following the invention will be described with reference to the accompanying schematical drawings in which FIGS. 1, 2 and 3 show a sintering capsule with tubes running through it intended for use in a method according to the invention: FIG. 1 shows the capsule seen against a concave surface corresponding to the high pressure side of the vane blade, FIG. 2 a section along the line II - II in FIG. 1 and FIG. 3 a section along the line III - III in FIG. 2.

FIGS. 4 and 5 show a sintering capsule for shaping cooling channels in a gas turbine vane by means of completely closed tubes enclosed in the capsule. FIG. 4 shows the capsule in cross-section and FIG. 5 partly seen against the concave surface and partly along the line V — V in FIG. 4.

DESCRIPTION OF THE PREFERRED EMBODIMENTS

Figure 6:
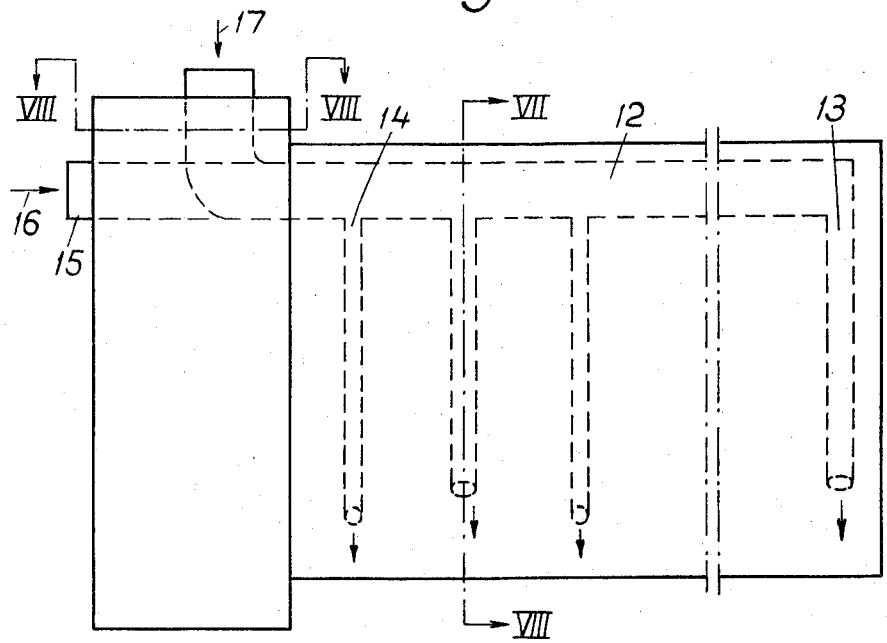
FIGS. 6, 7 and 8 show a turbine vane manufactured in accordance with the invention.

In FIGS. 1, 2 and 3 the sintering capsule is designated 1. The part of the capsule intended to form the base of the blade is designated 2. The capsule 1 is a material normally used for the capsule in hot-compacting and is provided with a plurality of metal tubes 3 running through it which are intended to form cooling channels in the finished blade. The tubes 3 are made of a metal having good adhesion ability with the blade material, preferably an alloy consisting for the most part of metals included in the sintering powder to be used. The tubes are arranged fairly close together along the externally concave capsule wall 4 and not quite so close along the externally convex wall 5 of the capsule. The cooling tubes are open at the ends and lead out of the capsule although they are welded to the walls of the capsule in gas-tight manner.

When the cooling tubes have been placed in the capsule, the sintering material is poured in, preferably packed together to a certain extent, after which the capsule is sealed except form an opening intended for evacuation. The evacuation of the capsule can be performed at room temperature or after a certain amount of pre-heating, for example to a temperature of somewhat over 300°C.

When the capsule has been sufficiently evacuated, the evacuating opening is sealed and the capsule with its contents is heated to high temperature, for example above 1,000°C, or at least 800°C and is subjected at this temperature to high pressure, preferably 1,000 - 2,000 bars, or at least 500 bars, using a gas, for example argon, as pressure medium. It has been found that, the harder and more temperature resistant the material selected, the higher must be the sintering temperature, in certain cases above 1,200°C.

The capsule 6 shown in FIGS. 4 and 5 can be made of glass of a type which becomes plastic when heAted to the required compacting temperature. Tubes 7 of glass or metal are used. The tubes are sealed at the ends after insertion of solid bodies 8 of a material which at the compacting temperature has a vapour pressure which is sufficiently great to prevent any noticeable compression of the tubes 7 when the capsule is subjected to the compacting pressure after being filled with powder, evacuated and heated. The end walls 9 and 10 have a number of recesses intended one for each of the tube ends. One of the ends walls may suitably be in the form of a lid which is melted together with the capsule when the tubes 7 have been arranged in the desired position. It is also possible to design one end wall, or both of them, with through-holes for the tubes, said holes being melted together when the tubes are in position. Instead of using a solid body 8, each tube may be provided with a quantity of liquid which upon vaporization produces high pressure. If the thin-walled tubes are made relatively strong and permit considerable cross-sectional reduction under the action of the compacting pressure, for example linearly 50 percent (i.e., a reduction of the cross-sectional surface to 25 percent of the original value) it may be counted on that the tube walls themselves will be able to take up a considerable proportion of the external pressure and that in certain cases it must be sufficient instead of the solid body 8 to enclose a gas in the tube at ambient temperature and atmospheric pressure, preferably an inert gas, for example argon. It is also possible to enclose a compressed gas at ambient temperature or supply the gas and close the tube at such a low temperature that the gas is liquid, in which case a specific quantity must be inserted in each tube. Usually it is suitable to select the internal gas pressure arising at maximum temperature for the tubes in such a way that the linear reduction of the tubes during compaction occurs according to the same scale as for the capsule. If the linear measurement of the capsule is reduced to $k$ percent of the original values during the compacting, however, a corresponding per cent value of between $(k + 40)$ and $(k + 30)$ is permissible for the tubes.

Figure 7:
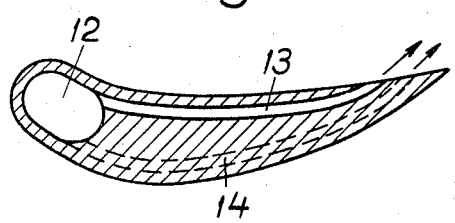
Figure 8:
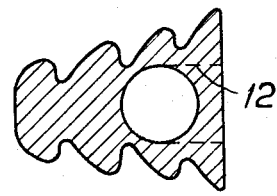

FIGS. 6, 7 and 8 show an example of a tubine vane manufactured in accordance with the invention. FIG. 6 is a view towards the concave side of the vane and FIG. 7 a cross-section along the line VII — VII in FIG. 6. The cooling system shown has been produced by placing a pre-fabricated tube System in a sintering capsule. A tube system is used consisting of a tube 12 having relatively large cross-section and communicating with a plurality of transverse tube branches 13 and 14 which together with the main tube from a unit which is very convenient to insert in the sintering capsule. During manufacture the tube ends may either be closed or at least one, preferably the tube end 15, may be open and drawn through the capsule wall in gas-tight manner in one of the alternative ways shown, i.e., the tubes ends with inlet opening either according to the arrow 16 or the arrow 17. The latter alternative, which is shown in FIG. 8, is used when a plurality of blades arranged radially at the edge of a carrier ring are to be supplied with coolant in the form of an axially directed air flow aimed at the carrier ring. The closed tube ends are opened by means of grinding.

We claim:

1. Method of manufacturing a blade for a gas turbine, having a plurality of internal cooling channels, by means of isostatic compression, using a sintering capsule of material which at least at high temperatures can be plastically deformed, the capsule having substantially the same shape, enlarged, as the blade, which comprises providing the capsule with a plurality of thin-walled tubes arranged substantially parallel to capsule wall parts corresponding to the high and low pressure surfaces of the blade, pouring a powdered material into the capsule and evacuating the filled capsule, the evacuated capsule space being gas-tightly separated from the spaces surrounded by said tubes, sealing the capsule and heating the capsule together with its contents to at least 800°C, subjecting the heated capsule to an external gas pressure of at least 500 bars while simultaneously subjecting the tubes to such a high internal gas pressure that the linear decrease in the tube cross-section is at the most 50 percent.

2. Method according to claim 1, which comprises arranging said tubes in at least two rows, the first row being nearest and parallel to a first capsule wall part, and a second row nearest and parallel to a second capsule wall part, said first wall part corresponding to the high pressure side and said second wall part to the low pressure side of the blade to be manufactured.

3. Method according to claim 2, in which the total tube cross-section of said first row is greater than that of said second row.

4. Method according to claim 1, in which said tubes are formed as branches on a thicker tube communicating with them which is arranged with at least one end at a wall of the capsule.

5. Method according to claim 1, in which the step of subjecting the tubes to said internal gas pressure comprises introducing into a tube at a relatively low temperature a substance which at least at the sintering temperature emits vapour, and sealing the ends of the tube whereby, the tube is heated at the same time as the sintering material.

6. Method according to claim 5, in which said substance is a solid substance which at the necessary sintering temperature has a vapor pressure which is greater than 60 percent of the maximum gas pressure applied on the outside of the sintering capsule.

7. Method according to claim 5, in which said substance is gaseous at 20°C and 1 bar.

8. Method according to claim 7, in which said substance is liquid when inserted in the tube.

* * * * *